United States Patent [19]
Kase et al.

[11] Patent Number: 5,164,934
[45] Date of Patent: Nov. 17, 1992

[54] TRAY LOADING APPARATUS FOR DISC PLAYERS

[75] Inventors: Masao Kase; Ryo Matsuura; Nobuhiro Suzuki, all of Tokorozawa, Japan

[73] Assignee: Pioneer Electronic Corporation, Tokyo, Japan

[21] Appl. No.: 599,574

[22] Filed: Oct. 18, 1990

[30] Foreign Application Priority Data

Dec. 20, 1989 [JP] Japan ................................. 1-328134

[51] Int. Cl.⁵ ...................... G11B 17/04; G11B 33/02; G11B 31/00
[52] U.S. Cl. .................................... 369/77.1; 369/19; 360/99.06
[58] Field of Search ................ 369/77.1, 77.2, 75.1, 369/75.2, 33, 34, 19; 360/99.02, 99.06, 99.03, 99.07, 94

[56] References Cited

U.S. PATENT DOCUMENTS

| | | | |
|---|---|---|---|
| 4,500,983 | 2/1985 | Sugiyama et al. | 369/77.2 |
| 4,809,254 | 2/1989 | Scheffler | 369/77.1 |
| 4,894,814 | 1/1990 | Yamada et al. | 369/19 |

Primary Examiner—John W. Shepperd
Assistant Examiner—Michael C. Kessell
Attorney, Agent, or Firm—Sughrue, Mion, Zinn, Macpeak & Seas

[57] ABSTRACT

A control circuit of a tray loading apparatus determines, according to a disc size and a tray moving direction, a time during which to control the motor at a constant speed. When the specified time has elapsed after the motor was started, the control circuit produces a pulse-width modulated output to slowly lower the motor speed, eliminating impact noise when the tray strikes a stopper. This motor deceleration time is measured. When the measured deceleration time disagrees with a preset or previously detected target deceleration time, the difference is either added to or subtracted from a constant-speed motor operation time and the resultant value is taken as the next target time for constant-speed motor operation. In this way, by changing the time during which the motor is driven at a constant speed, any variations in the tray moving speed as might occur from varying loads on the motor are absorbed to keep the motor deceleration time and decelerating speed unchanged, thus making the tray motion smooth.

9 Claims, 3 Drawing Sheets ns perform a pulse-width modulation according to the mechanism load requires a very complicated circuit configuration.

TRAY LOADING APPARATUS FOR DISC PLAYERS

BACKGROUND OF THE INVENTION

The present invention relates to a tray loading apparatus in an optical disc player which moves the tray containing an optical disc (video disc, compact disc, etc.) to a position of a turntable for recording or reproducing the disc.

Prior Art

In such conventional tray loading apparatuses as mentioned above, the tray is drawn into or out of the disc player by meshing a motor-powered gear with a rack formed on the tray and controlling the rotation of the motor.

The following methods are available for controlling the revolution of the motor.

(a) Switches are arranged one each at the finishing positions of the tray loading and unloading operations, and a certain voltage is applied to the motor until one of the switches turns off, thus driving the tray at a specified constant speed.

(b) Switches are arranged one each at the finishing positions of the tray loading and unloading operations; another switch is located at an intermediate positions for the tray loading and unloading operations; a certain voltage is applied to the motor until one of the second switches turns on and, after that second switch is turned on and until the switch at the finishing position turns off, the applied voltage to the motor is reduced to a specified level, thereby driving the tray at a constant low speed.

(c) Switches are provided one each at the finishing positions of the tray loading and unloading operations as with the method (a); a certain voltage is applied to the motor for a specified length of time and, after the elapse of that period until one of the switches at the finishing positions turns off, the applied voltage to the motor is slowly lowered by a pulse-width modulation so as to gradually reduce the moving speed of the tray.

The first motor control method (a) requires at least two switches, increasing the number of parts and making the apparatus costly. Another drawback is that since the tray strikes with force the stoppers at the tray inserted and withdrawn positions, large impact noise is generated.

With the second method (b), because the tray moving speeds at the terminal or finishing positions of the loading and unloading operations are slower, the impact noise is lower than that produced in the method (a). However, one additional switch is needed for speed reduction, increasing the parts count and therefore the manufacturing cost. Another disadvantage is that the tray moving speed is abruptly changed, resulting in an unnatural behavior of the tray, which in turn mars an image as a quality product.

As to the third motor control method (c), although there is an advantage of lower impact noise because the tray moving speed at the stop position is smaller than that in the method (b), this method has a drawback in that as the mechanism load changes over a long period of use or due to mechanism parts variations from manufacturing errors, the tray decelerating speed will vary. As a result the tray speed at the finish position cannot be the same at all times. Because of this, an attempt to

SUMMARY OF THE INVENTION

It is an object of the invention to solve the aforementioned problems and provide a tray loading apparatus for disc players in which, even when a mechanism load changes over a long period of use or due to mechanism parts variations from manufacturing errors, the time in which the tray is driven in a decelerating state can be kept constant, making it possible to perform the motor control in a predetermined constant decelerating condition and thereby keeping the tray speed at the stop position equal at all times.

To achieve the above objective, the tray loading apparatus for disc players according to this invention comprises: a loading motor revolution speed control means capable of performing a wide range of motor control from a constant speed control to a deceleration control; a timer for measuring a time which elapses from the start of motor deceleration to the end of deceleration; and a control circuit for calculating a time during which the motor is to be driven at a constant speed.

PREFERRED EMBODIMENT OF THE INVENTION

Figure 1:
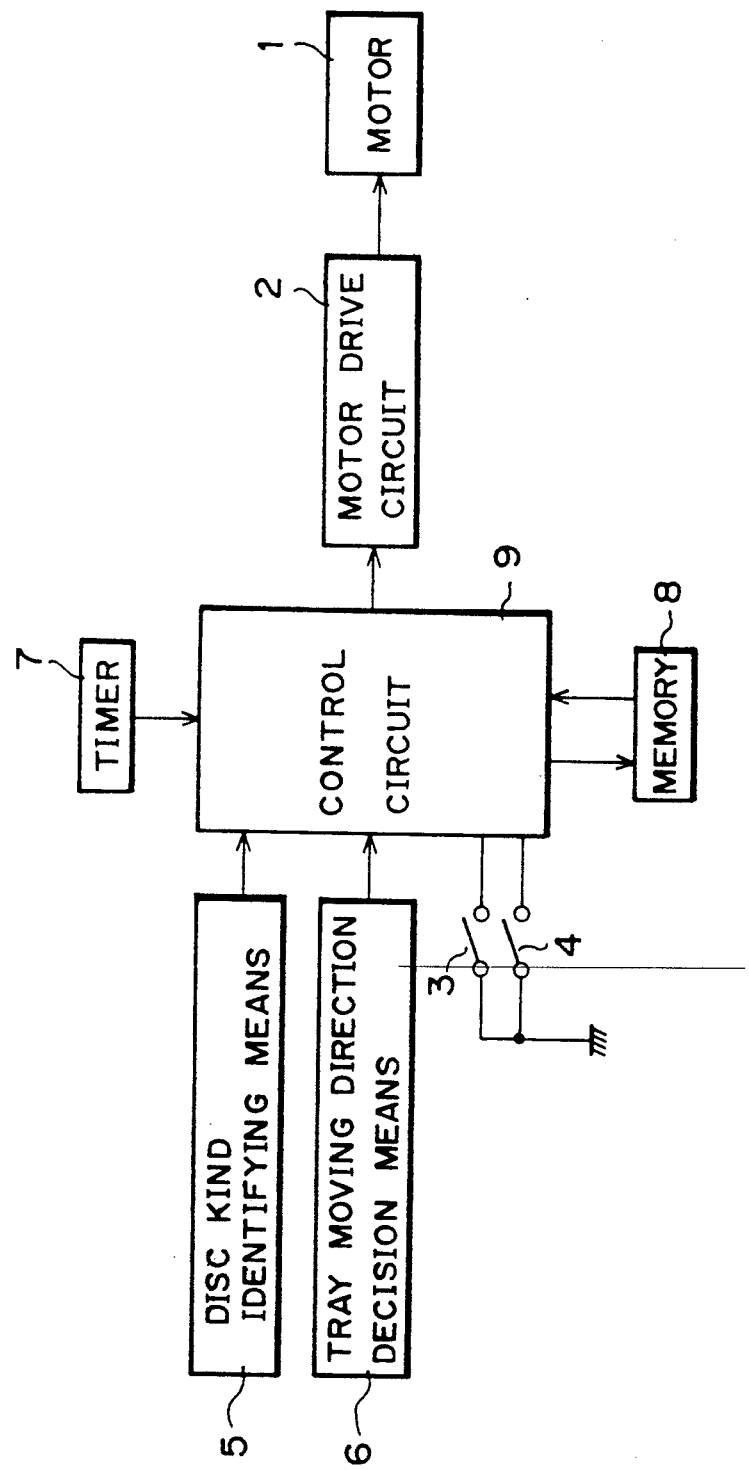
FIG. 1 is a block diagram of the tray loading apparatus of the present invention.

One preferred embodiment of this invention will be described by referring to the accompanying drawings. In FIG. 1, reference numeral I represents a motor for moving a tray between an inserted position and a withdrawn or ejected position. Denoted 2 is a motor drive circuit to drive and control the motor 1 through a pulse-width modulation. Designated 3, 4 are switches for detecting the tray located at finishing positions of tray loading and unloading operations. A disc kind identifying means 5 produces an output representing the size of a disc placed on the tray, a signal that indicates whether the disc is a video disc, compact disc, or single disc (as described in Japanese Patent Application No. Heisei 1-221706). A tray moving direction decision means 6 produces an output indicating whether the tray should be moved in the inserting or withdrawing direction. Designated 7 and 8 are a timer and a memory, respectively. A control circuit 9 performs a series of operations as will be detailed in the flowchart of FIG. 2.

Figure 2:
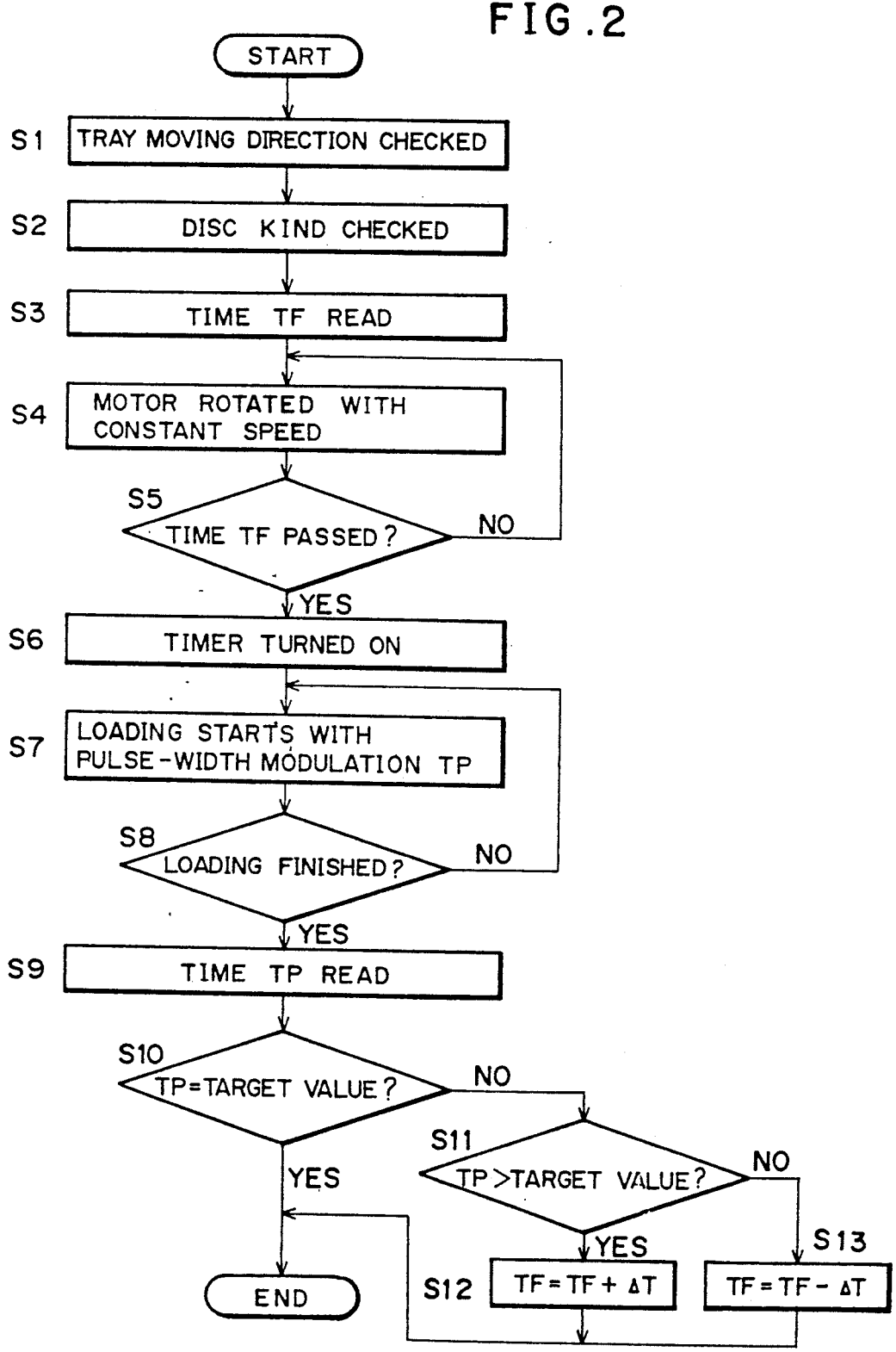
FIG. 2 is a flowchart showing the sequence of operations according to the present invention.
Figure 3:
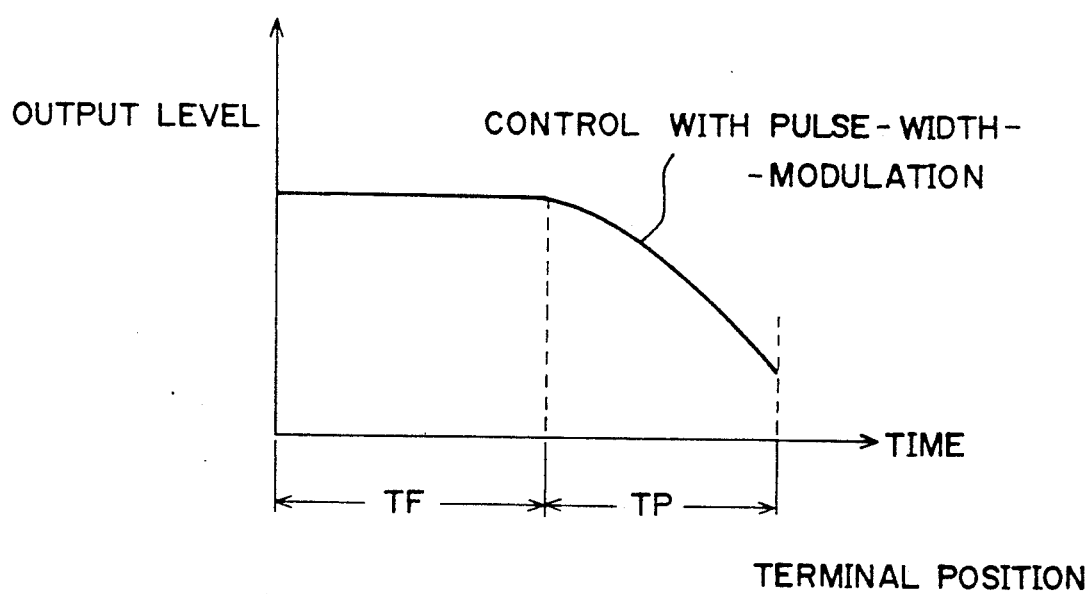
FIG. 3 is a graph showing a behavioral characteristic of a moving tray.

Now, referring to the flowchart of FIG. 2 and the operation characteristic diagram of FIG. 3, the operation of the apparatus with the above configuration will be described.

First, when an eject or play operation is performed, the control circuit 9 checks the output of the tray moving direction decision means 6 to decide in which direction—inserting or withdrawing direction—the tray is to be moved (step S1). The reason that the tray moving direction is checked is that since the center of gravity of the tray differs depending on the tray moving direction, the load acting on the motor 1. The loading time will vary according to the tray moving direction.

Following the check on the tray moving direction, the control circuit 9 checks the output of the disc kind identifying means 5 to determine the size of the disc (step S2). The reason for checking the disc size is that because a different size of the disc has a different weight, a change will occur in the load acting on the motor 1. Therefore, in the tray loading time will change depending on the disc size.

The control circuit 9, taking into consideration the tray moving direction and the disc kind, reads a preset time from memory 8 to calculate a time $t_f$ during which to control the motor 1 at a constant speed (step S3). With the time $t_f$ determined, the control circuit 9 generates an output of a specified voltage for rotating the motor 1 at the predetermined constant speed and sends it to a motor drive circuit 2 (step S4). The motor 1 now starts rotating at the predetermined constant speed, loading the tray at a constant speed.

Under this condition, the control circuit 9 monitors the time elapsed to check if the time $t_f$ is exceeded (step S5). If the time has not been reached, the processing returns to step S4; when the time is reached, a timer 7 is turned on (step S6). After this, the control circuit 9 produces a pulse-width modulated output which will cause the motor revolution speed to gradually slow down. The circuit 9 feeds this signal to the motor drive circuit 2 (step S7). As a result, the motor 1 slowly lowers its revolution while loading the tray at a decreasing speed.

During this loading operation, the control circuit 9 checks whether the terminal position detecting switch 3 or 4 is closed (step S8). When the switch 3, 4 is not turned on, the processing returns to the step S7; when the control circuit 9 detects the closure of the switch 3, 4, it reads the time count of the timer 7 (step S9). Let us assume that the time count at that moment is $t_p$. The control circuit 9 then checks if the time $t_p$ agrees with a preset or previously detected target value (step 10). When they match, the control circuit 9 ends the processing without rewriting the contents of the memory 8. When they do not agree, a check is made of whether the timer count is greater than the target value (step S11).

When the timer count is greater than the target value, their difference $\Delta t$ is added to the time $t_f$ and the resultant time is set as a new target time $t_f$ in memory 8 (step S12). When the timer count is smaller than the target value, the difference $\Delta t$ is subtracted from the target time $t_f$ and the resultant time is set as a new target time $t_f$ in memory 8 (step S13), which is used as the next target time $t_f$ for loading operation. As a result, the time during which the motor 1 is gradually decelerated remains unchanged. Since a change in the speed of the tray movement caused by the load variations is translated into a change in the time in which the motor is driven at a constant speed, the decelerating speed of the tray is not influenced by the load variations but remains the same at all times.

As mentioned above, since the tray loading apparatus of this invention absorbs changes in the load applied to the motor by making variable the time during which the tray is driven at a constant speed, the decelerating speed at near the terminal position of the tray withdrawing and inserting operation can be kept at the same speed at all times. Not only does this permit reliable withdrawal and insertion of the tray but also eliminates impact noise produced when the tray strikes the stopper. The tray loading apparatus has another advantage of not requiring a switch for speed change, contributing to a reduction in the manufacturing cost.

What is claimed is:

1. A tray loading and unloading apparatus comprising:

driving means for driving a tray loading motor, which is used to move a tray from an initial position to a terminal position, by controlling rotation speed of the motor;

a timer for measuring time; and a control circuit for controlling said drive means and said timer, wherein said control circuit controls said drive means so that the loading motor is rotated at a constant speed for a set period of time TF, and in response to an expiration of time period TF, said control circuit controls said drive means so that the rotation speed of the loading motor is gradually decreased in a deceleration period until the tray reaches a terminal position, said control circuit controlling said timer to measure a time duration of the deceleration period, said control circuit further calculating and updating the period of time TF based on the time measured by said timer, for use during a subsequent loading or unloading process, during which said loading motor is to be driven at a constant speed, in order to compensate for variations in a loading or unloading process, wherein the time period TF, for use during the subsequent loading or unloading process, is determined by a deviation between a target value and a value of time measured by said timer, said control means updating and setting said time period TF in accordance with the deviation thus determined.

2. A tray loading and unloading apparatus comprising:

driving means for driving a tray loading motor, which is used to move a tray from an initial position to a terminal position, by controlling rotation speed of the motor;

a timer for measuring time; and a control circuit for controlling said drive means and said timer, wherein said control circuit controls said drive means so that the loading motor is rotated at a constant speed for a set period of time TF, and in response to an expiration of time period TF, said control circuit controls said drive means so that the rotation speed of the loading motor is gradually decreased in a deceleration period until the tray reaches a terminal position, said control circuit controlling said timer to measure a time duration of the deceleration period, said control circuit further calculating and updating the period of time TF based on the time measured by said timer, for use during a subsequent loading or unloading process, during which said loading motor is to be driven at a constant speed, in order to compensate for variations in a loading or unloading process.

3. The tray loading and unloading apparatus as recited in claim 2, wherein the time period TF, for use during the subsequent loading or unloading process, is determined by a deviation between a target value and a value of time measured by said timer, said control means updating and setting said time period TF in accordance with the deviation thus determined.

4. The tray loading and unloading apparatus recited in claim 3, further comprising:

identifying means for identifying a type of recording medium disposed in the tray; and memory means for storing a plurality of time periods TF according to a plurality of recording medium types.

5. The tray loading and unloading apparatus recited in claim 4, wherein said control circuit monitors said timer and determines if a measured time of the deceleration period is greater than a target value, and in response to such determination, said control circuit determines the deviation between the measured time and the target value, adds such deviation to the time period TF stored in said memory means, and stores the resultant thereof.

6. The tray loading and unloading apparatus recited in claim 4, wherein said control circuit monitors said timer and determines if a measured time of the deceleration period is less than a target value, and in response to such determination, said control circuit determines the deviation between the target value and the measured value and subtracts such deviation from the time period TF stored in said memory means, and stores the resultant thereof.

7. The tray loading and unloading apparatus recited in claim 4, wherein the tray loads and unloads a compact disc into a compact disc apparatus.

8. The tray loading and unloading apparatus recited in claim 2, wherein the variations in the loading or unloading process are due to variations in the load of the motor during the loading or unloading process.

9. The tray loading and unloading apparatus as recited in claim 2, further comprising identifying means for identifying a type of recording medium disposed in the tray, said control circuit setting the period of time TF according to the output of said identifying means.

* * * * *